(12) United States Patent
Shibagami (10) Patent No.: US 8,964,101 B2
(45) Date of Patent: Feb. 24, 2015

(54) IMAGING APPARATUS AND METHOD FOR CONTROLLING THE SAME

(75) Inventor: Genjiro Shibagami, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 173 days.

(21) Appl. No.: 12/854,813

(22) Filed: Aug. 11, 2010

(65) Prior Publication Data

US 2011/0043681 A1 Feb. 24, 2011

(30) Foreign Application Priority Data

Aug. 18, 2009 (JP) .................................. 2009-189154

(51) Int. Cl.
G03B 13/00 (2006.01)
H04N 5/232 (2006.01)
G02B 7/36 (2006.01)
G03B 13/36 (2006.01)

(52) U.S. Cl.
CPC ....... *G02B 7/36* (2013.01); *G03B 13/36* (2013.01); *H04N 5/23212* (2013.01)
USPC ............ 348/349; 348/347; 348/345; 348/352

(58) Field of Classification Search
USPC .................. 348/349, 347, 345, 352
See application file for complete search history.

(56) References Cited

U.S. PATENT DOCUMENTS

| 2007/0030381 | A1 | 2/2007 | Maeda | |
| 2007/0177862 | A1* | 8/2007 | Terayama et al. | 396/133 |
| 2008/0205870 | A1* | 8/2008 | Ueda | 396/125 |
| 2009/0009651 | A1 | 1/2009 | Takayanagi | |
| 2009/0322932 | A1* | 12/2009 | Ishiwata | 348/345 |

FOREIGN PATENT DOCUMENTS

| JP | 2006-201282 A | | 8/2006 |
| JP | 2007-178577 A | | 7/2007 |
| JP | 2007-206433 A | | 8/2007 |
| JP | 2007206433 A | * | 8/2007 |
| JP | 2008-180906 A | | 8/2008 |
| JP | 2009-31760 A | | 2/2009 |

* cited by examiner

*Primary Examiner* — Antoinette Spinks
(74) *Attorney, Agent, or Firm* — Canon USA, Inc. IP Division

(57) ABSTRACT

An apparatus includes an imaging unit configured to photoelectrically convert an object image incident via a focus lens to acquire image data; a detection unit configured to detect a size and a position of an object based on the acquired image data; an adjustment unit configured to execute focus adjustment by acquiring a focus signal indicating a focusing state of the focus lens based on the image data while moving the focus lens, and moving the focus lens based on the focus signal; and a control unit configured to execute an operation if the detected size has changed, and to change the operation if the detected position has changed while the detected size has not changed.

3 Claims, 6 Drawing Sheets

IMAGING APPARATUS AND METHOD FOR CONTROLLING THE SAME

BACKGROUND OF THE INVENTION

1. Field of the Invention

The present invention relates to an imaging apparatus and a method for controlling the imaging apparatus, and particularly, to a technique suitable for use in focus adjustment during the wait for shooting.

2. Description of the Related Art

Conventionally, in an electronic still camera, a video camera, or the like, when an autofocus (hereinafter, referred to as AF) is executed, a method is used in which a lens position where a high-frequency component of a luminance signal obtained from an image sensor, such as a charge-coupled device (CCD), (hereinafter referred to as an AF evaluation value) is maximized is determined to be an in-focus position. As one of these methods, the following scanning method is known.

In a first scanning method, the AF evaluation value obtained from a predetermined area (hereinafter referred to as an AF frame) in an image sensor is stored while driving a focus lens throughout a scanning range. Then, a focus lens position corresponding to the maximum value thereof among the stored AF evaluation values (hereinafter referred to as a peak position) is determined to be an in-focus position. The in-focus position is a lens position to be assumed that focus is adjusted on an object.

As a second scanning method, there is a technique of detecting an object to be focused using an image signal obtained from an image sensor to execute an AF based on information about the detected object (size and position), thereby adjusting focus at a high speed.

For example, in Japanese Patent Application Laid-Open No. 2006-201282, a technique is discussed in which based on the size of the detected face, an approximate distance is obtained, then, based on the obtained distance, a position determined to be a scanning start point is determined, and the far side farther than that position is not scanned, thereby shortening an AF time. Further, for example, in Japanese Patent Application Laid-Open No. 2009-31760, a technique is discussed in which a searching range of scanning by a focus lens is set based on a time-series change in size of the detected face.

However, in a digital camera discussed in the above-described Japanese Patent Application Laid-Open No. 2006-201282 and an imaging apparatus discussed in Japanese Patent Application Laid-Open No. 2009-31760, a scanning range or a searching range is set based on the size of an object. Accordingly, when the position of the object is changed, a background-focused state may occur in which focus is adjusted on the background located far from the main object.

This is because when the position of the object has been changed, an AF frame may move away from the object.

SUMMARY OF THE INVENTION

According to an aspect of the present invention, an apparatus includes an imaging unit configured to photoelectrically convert an object image incident via a focus lens to acquire image data; a detection unit configured to detect a size and a position of an object based on the acquired image data; an adjustment unit configured to execute focus adjustment by acquiring a focus signal indicating a focusing state of the focus lens based on the image data while moving the focus lens, and moving the focus lens based on the focus signal; and a control unit configured to execute an operation if the detected size has changed, and to change the operation if the detected position has changed while the detected size has not changed.

According to another aspect of the present invention, a method for controlling an apparatus includes photoelectrically converting an object image incident via a focus lens to acquire image data, detecting a size and a position of an object based on the acquired data, executing focus adjustment by acquiring a focus signal indicating a focusing state of the focus lens based on the image data while moving the focus lens, and moving the focus lens based on the focus signal, and executing an operation if the detected size has changed, and to change the operation if the detected position has been changed while the detected size has not changed.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Elements of one embodiment may be implemented by hardware, firmware, software or any combination thereof. The term hardware generally refers to an element having a physical structure such as electronic, electromagnetic, optical, electro-optical, mechanical, electro-mechanical parts, etc. A hardware implementation may include analog or digital circuits, devices, processors, applications specific integrated circuits (ASICs), programmable logic devices (PLDs), field programmable gate arrays (FPGAs), or any electronic devices. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc., that is implemented or embodied in a hardware structure (e.g., flash memory). Examples of firmware may include microcode, writable control store, micro-programmed structure. When implemented in software or firmware, the elements of an embodiment may be the code segments to perform the necessary tasks. The software/firmware may include the actual code to carry out the operations described in one embodiment, or code that emulates or simulates the operations. The program or code segments may be stored in a processor or machine accessible medium. The "processor readable or accessible medium" or "machine readable or accessible medium" may include any medium that may store or transfer information. Examples of the processor readable or machine accessible medium that may store include a storage medium, an electronic circuit, a semiconductor memory device, a read only memory (ROM), a flash memory, an erasable programmable ROM (EPROM), a floppy diskette, a compact disk (CD) ROM, an optical storage medium, a magnetic storage medium, a memory stick, a memory card, a hard disk, etc. The machine accessible medium may be embodied in an article of manufacture. The machine accessible medium may include information or data that, when accessed by a machine, cause the machine to perform the operations or actions described above. The machine accessible medium may also include program code, instruction or instructions embedded therein. The program code may include machine readable code, instruction or instructions to perform the operations or actions described above. The term "information" or "data" here refers to any type of information that is encoded for machine-readable purposes. Therefore, it may include program, code, data, file, etc.

All or part of an embodiment may be implemented by various means depending on applications according to particular features, functions. These means may include hardware, software, or firmware, or any combination thereof. A hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

Various exemplary embodiments, features, and aspects of the invention will be described in detail below with reference to the drawings.

Figure 1:
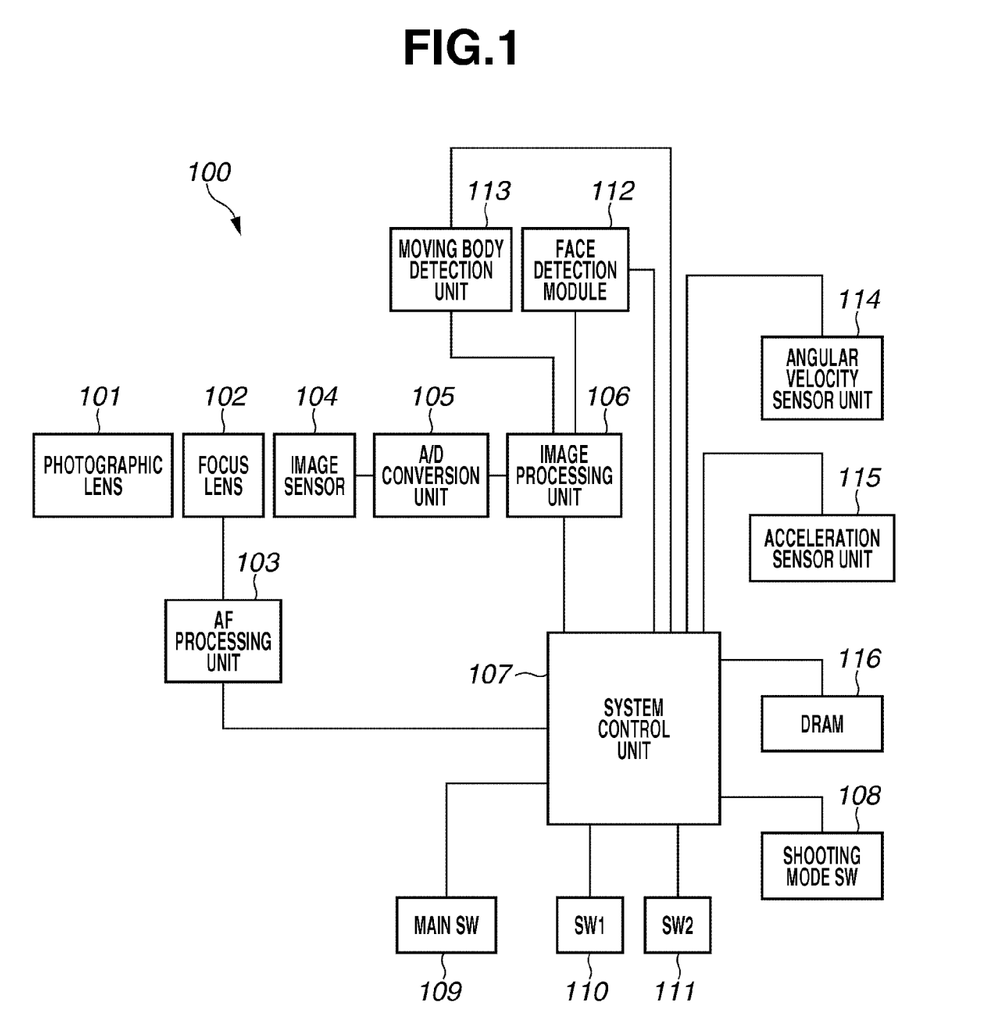
FIG. 1 is a block diagram illustrating a configuration example of an imaging apparatus.

FIG. 1 is a block diagram illustrating a configuration example of an imaging apparatus 100 according to an exemplary embodiment of the present invention. In FIG. 1, a photographic lens 101 includes a zooming mechanism. A focus lens 102 executes focus adjustment for adjusting focus on an image sensor, which will be described below. An AF processing unit 103 drives the focus lens 102. An image sensor 104 executes photoelectric conversion for converting an object image incident via the focus lens 102 into an electric signal to acquire image data. An analog-to-digital (A/D) conversion unit 105 includes a correlated double sampling (CDS) circuit for removing an output noise on the image sensor 104 and a nonlinear amplifier circuit to be executed before A/D conversion.

An image processing unit 106 extracts a signal component of a specific frequency band concerning luminance of an object from an output signal from the A/D conversion unit 105. Color information or the like in the predetermined area of an image can be acquired using the image processing unit 106. A system control unit (hereinafter referred to as a central processing unit (CPU)) 107 controls a system such as a shooting sequence to control an operation of the whole imaging apparatus in the present exemplary embodiment. A shooting mode switch 108 executes a setting such as switching on or off a face detection mode. A main switch 109 is operable for inputting a power source to a system. A switch (hereinafter referred to as SW1) 110 is operable for executing a shooting standby operation such as an AF and an AE. A shooting switch (hereinafter referred to as SW2) 111 is operable for executing shooting after the operation of the SW1.

A face detection module 112 executes detection of a face using an image signal processed by the image processing unit 106 to transmit one or a plurality of pieces of the detected face information (position, size, and reliability) to the CPU 107. A moving body detection unit 113 detects whether an object and a background in a screen are moving to transmit moving body information to the CPU 107. Specifically, the moving body detection unit 113 compares two images lining in time series among image signals processed by the image processing unit 106 to detect moving body information on the object/background (amount of operation, position, and range) from the difference information thereof.

An angular velocity sensor unit 114 detects an angular velocity of a camera itself to transmit motion information on the camera to the CPU 107. Whether the camera is made ready in a state of a portrait position or a landscape position can also be detected using the angular velocity sensor unit 114. An acceleration sensor unit 115 detects acceleration of the camera itself to transmit motion information on the camera to the CPU 107. Whether the camera is made ready with the photographic lens 101 upward or downward can also be detected using the acceleration sensor unit 115. The imaging apparatus 100 further has a high-speed internal memory (e.g., random access memory etc., hereinafter referred to as dynamic random access memory (DRAM)) 116.

Figure 2:
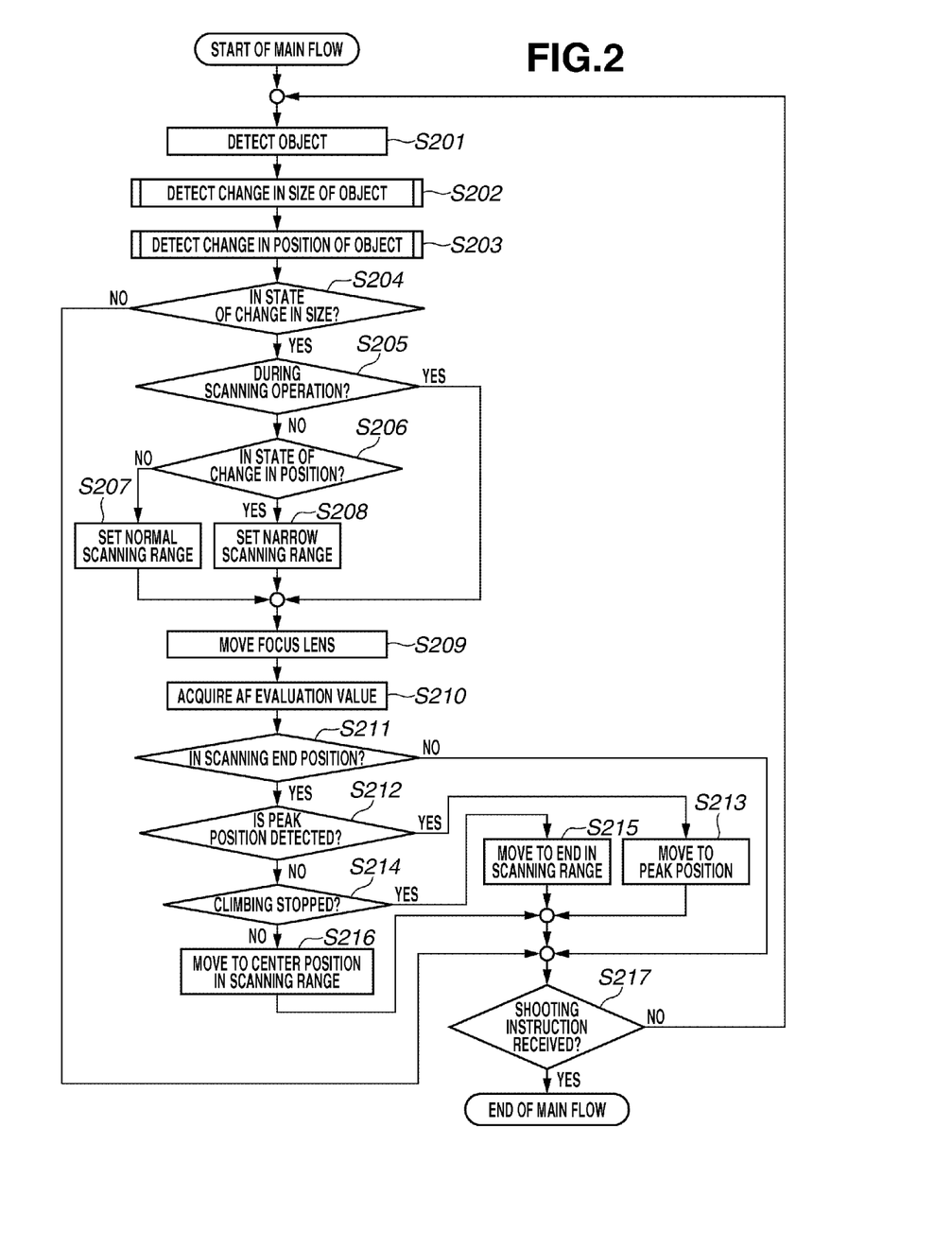
FIG. 2 is a flowchart illustrating a continuous scanning operation by the imaging apparatus.

Next, referring to a flowchart in FIG. 2, a continuous scanning operation will be described, which is executed when an object is detected by an imaging apparatus, according to a first exemplary embodiment of the present invention. In FIG. 2, an operation, which stores an AF evaluation value obtained from an AF frame in the image sensor 104 while moving the focus lens 102, moves the focus lens 102 based on the AF evaluation value, and executes focus adjustment, refers to a scanning operation (focus adjustment operation). The AF evaluation value in FIG. 2 is an example of a focus signal that indicates a focusing sate of the focus lens 102.

In step S201, the CPU 107 executes detection of an object. In the present exemplary embodiment, the object is a face. However, if a size and a position can be detected, the object may not be the face. In detection of the object, the face is detected by the face detection module 112.

Next, in step S202, the CPU 107 detects whether a size of the face is changed. The detail of processing to be executed in step S202 will be described below referring to FIG. 3. Next, in step S203, the CPU 107 detects whether a position of the face is changed. The detail of processing to be executed in step S203 will be described below referring to FIG. 4.

Next, in step S204, the CPU 107 executes determination of whether the object is in a state of a change in size of the face detected in step S202. As the result of this determination, if it is in a state in which the size of the face is changed (YES in step S204), the processing proceeds to step S205. Further, if it is in a state in which the size of the face is not changed (NO in step S204), the processing proceeds to step S217.

In step S217, the CPU 107 executes determination of whether shooting is instructed. As the result of this determination, if shooting is instructed (YES in step S217), the continuous scanning operation in detecting the object ends. If the shooting is not instructed (NO in step S217), the processing returns to detection of an object in step S201.

In step S205, the CPU 107 executes determination of whether the imaging apparatus is during a scanning operation. As the result of this determination, if the imaging apparatus is not during the scanning operation (NO in step S205), then in step S206, the CPU 107 executes determination of whether a position of the detected face is changed. A setting operation for setting a focus detection area when the focusing sate of a focus lens is detected is changed according to the result of this determination. In other words, if it is determined that the position of the face is not changed (NO in step S206), the processing proceeds to step S207. If it is determined that the position of the face is changed (YES in step S206), the processing proceeds to step S208.

In step S207, the CPU 107 sets a normal scanning range that is a moving range of the focus lens 102. The normal scanning range in the present exemplary embodiment is an area five times as large as a focal depth which is a range to be considered that focus is adjusted on each of the near side and the far side about a current focus lens position. On the other hand, in step S208, the CPU 107 sets a narrow scanning range and the processing proceeds to step S209. The narrow scanning range is an area narrower than the normal scanning range. In the present exemplary embodiment, the narrow scanning range is an area half the normal scanning range.

In step S208, the narrow scanning range is set. Thus, when an AF frame has been located outside the object, even if a peak position of the AF evaluation value which is the scanned result has deviated to the background side, it becomes half the scanning range at a maximum. Accordingly, it can be prevented from greatly deviating. Further, in the present exemplary embodiment, a scanning start position is the far end of the scanning range, and a scanning end position is the near end of the scanning range.

After processing in step S207 or step S208 ends, the processing proceeds to step S209. In step S209, the focus lens 102 is moved. Next, in step S210, the AF evaluation value in the moved focus lens position is acquired. Next, in step S211, the CPU 107 executes determination of whether the focus lens 102 has been moved to the scanning end position.

As the result of determination in step S211, when the focus lens has not been moved to the scanning end position (NO in step S211), then in step S217, the CPU 107 executes determination of whether shooting is instructed. On the other hand, when the focus lens has been moved to the scanning end position (YES in step S211), then in step S212, the CPU 107 executes determination of whether the peak position of the AF evaluation value is detected. As the result of this determination, when the peak position is detected (YES in step S212), then in step S213, the focus lens position is moved to the peak position. Thereafter, in step S217, the CPU 107 executes determination of whether shooting is instructed.

Further, as the result of determination in step S212, when the peak position is not detected (NO in step S212), then in step S214, the CPU 107 executes determination of whether the AF evaluation value is maximized in the scanning start position or the scanning end position, in which climbing stops. As the result of this determination, when climbing stops (YES in step S214), then in step S215, the focus lens position is moved to the end where climbing stops. Thereafter, in step S217, the CPU 107 executes determination of whether shooting is instructed. Furthermore, as the result of determination in step S214, when climbing does not stop (NO in step S214), then in step S216, the focus lens position is moved to the center position of the scanning range. Thereafter, in step S217, the CPU 107 executes determination of whether shooting is instructed.

Accordingly, the scanning operation is continuously executed. Thus, focus can continuously be adjusted to an object having motion in a distance direction. Further, when it has been determined to be in a state of a change in position, the scanning range is narrowed, thereby allowing an influence on the background-focused state to be suppressed.

Figure 3:
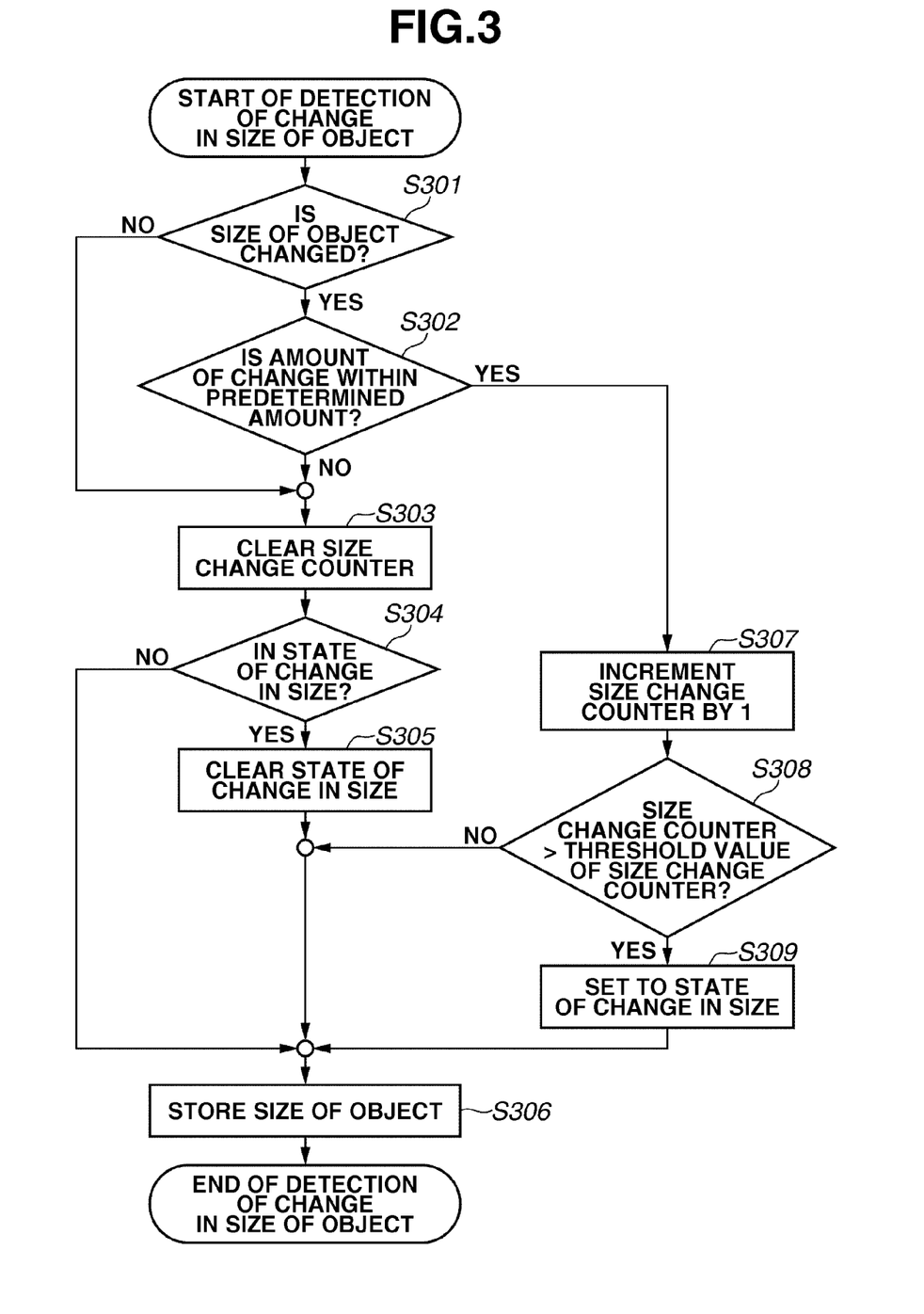
FIG. 3 is a flowchart illustrating a detection operation for a change in size of an object by the imaging apparatus.

Next, referring to a flowchart in FIG. 3, detection of a change in size of an object by the imaging apparatus according to the present exemplary embodiment will be described. In step S301, the CPU 107 determines whether the size of the detected object is changed. In determination of a change in size, the CPU 107 executes determination based on whether a difference is detected between the size of the object to be stored in the DRAM 116 in step S306 associated with the position of the focus lens 102 and the size of the object acquired this time.

As the result of determination in step S301, when it is determined that the size of the object is changed (YES in step S301), the processing proceeds to step S302. In step S302, the CPU 107 determines whether the difference is within a predetermined amount. As the result of this determination, when the difference is equal to or larger than the predetermined amount (NO in step S302), it is considered that the object detected this time is different from the object previously detected.

As the result of determination in step S301, when it is determined that the size of the object is not changed (NO in step S301), then in step S303, the CPU 107 sets a size change counter to zero. Thereafter, in step S304, the CPU 107 determines whether the object is in a state of a change in size. This is determined by reading whether the state of a change in size is set in the DRAM 116. The size change counter is a value which is stored in the DRAM 116 in order to determine whether the size of an object has continuously been changed.

On the other hand, as the result of determination in step in S302, when the amount of change in size of the object is not within the predetermined amount (NO in step S302), it is considered that the objects are different. Thus, the processing proceeds to step S303, in which the CPU 107 sets the size change counter to zero. Next, in step S304, as described above, the CPU 107 determines whether the object is in a state of a change in size.

As the result of determination in step S304, when it is in the state of a change in size (YES in step S304), then in step S305, the CPU 107 clears the state of a change in size which is stored in the DRAM 116. Next, in step S306, the CPU 107 stores the size of the object in the DRAM 116 and ends detection of a change in size of an object. On the other hand, as the result of determination in step S304, when it is not in the state of a change in size (NO in step S304), the processing directly proceeds to step S306. In step S306, the CPU 107 stores the size of the object in the DRAM 116 and ends detection of a change in size of an object.

Further, as the result of determination in step S302, when the amount of change in size of the object is within the predetermined amount (YES in step S302), the processing proceeds to step S307, in which the CPU 107 increments the size change counter by 1. Next, in step S308, the CPU 107 compares the size change counter and the threshold value of the size change counter which is a value to be stored in the DRAM 116. The threshold value of the size change counter is a threshold value to be determined that the object moves in a deep direction if the size of the object is continuously changed equal to or larger than that value. If the size change counter is smaller than or equal to the threshold value (NO in step S308), then in step S306, the CPU 107 stores the size of the object and then ends detection of a change in size of an object. Further, if the size change counter is larger than the threshold value of the size change counter (YES in step S308), the processing proceeds to step S309. In step S309, the CPU 107 stores the state of a change in size in the DRAM 116. Next, in step S306, the CPU 107 stores the size of the object and then ends detection of a change in size of an object.

The size of the object is detected by the face detection module 112 when the object is a face. When the object is not a face, the size of the object is detected from a change in color information acquired by the image processing unit 106. For example, the size of the object can be detected from a change in the same color area in an object area, luminance difference information to be detected by the moving body detection unit 113 in an object area, a change in in-focus distance in the peak position of the continuously scanned result, or the like.

Figure 4:
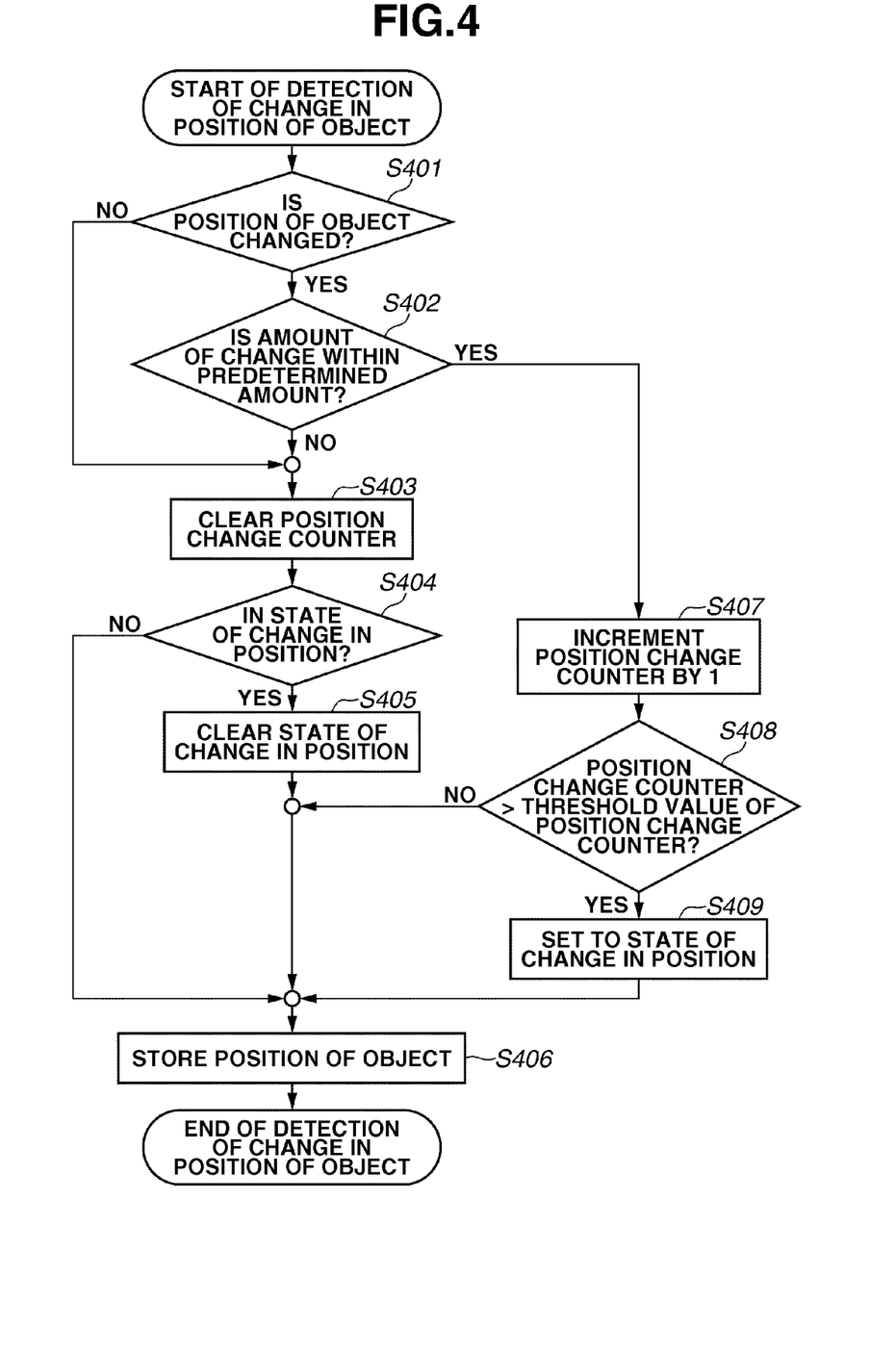
FIG. 4 is a flowchart illustrating a detection operation for a change in position of an object by the imaging apparatus.

Next, referring to a flowchart in FIG. 4, detection of a change in position of an object by the imaging apparatus according to the present exemplary embodiment will be described. In step S401, the CPU 107 determines whether a position of the detected object has been changed. In this determination of a change in position, the CPU 107 executes determination based on whether a difference is detected between the position of the object stored in the DRAM 116 in step S406 and the position of the object acquired this time.

As the result of this determination, when it is determined that the position of the object is changed (YES in step S401), then in step S402, the CPU 107 determines whether the difference is within a predetermined amount. In this determination, when the difference is equal to or larger than the predetermined amount (NO in step S402), it is considered that the object detected this time is different from the object previously detected.

As the result of the determination in step S401, when it is determined that the position of the object is not changed (NO in step S401), the processing proceeds to step S403. In step S403, the CPU 107 sets a position change counter to zero and then, in step S404, the CPU 107 determines whether the object is in a state of a change in position. This is determined by reading whether the state of a change in position is set in the DRAM 116. The position change counter is a value to be stored in the DRAM 116 in order to determine whether a position of an object has continuously been changed.

As the result of determination in step S402, when the amount of change in position of the object is not within the predetermined amount (NO in step S402), it is considered that the objects are different. Thus, in step S403, the CPU 107 sets the position change counter to zero. Next, in step S404, the CPU 107 determines whether the object is in a state of a change in position. As the result of this determination, when the object is in the state of a change in position (YES in step S404), then in step S405, the CPU 107 clears the state of a change in position stored in the DRAM 116. Next, in step 406, the CPU 107 stores the position of the object in the DRAM 116 and ends detection of a change in position of an object. Further, as the result of determination in step S404, when the object is not in the state of a change in position (NO in step S404), the processing directly proceeds to step S406. After the above-described processing is executed, the CPU 107 ends detection of a change in position of an object.

On the other hand, as the result of determination in step S402, when the amount of change in position of the object is within the predetermined amount (YES in step S402), the processing proceeds to step S407, in which the CPU 107 increments the position change counter by 1. Next, in step S408, the CPU 107 compares the position change counter and the threshold value of the position change counter which is a value stored in the DRAM 116. The threshold value of the position change counter is a threshold value to be determined that the object moves in a vertical or horizontal direction if the position of the object is continuously changed equal to or larger than that value. As the result of this determination, if the position change counter is smaller than or equal to the threshold value (NO in step S408), then in step S406, the CPU 107 stores the position of the object and then ends detection of a change in position of an object.

As the result of determination in step S408, if the position change counter is larger than the threshold value of the position change counter (YES in step S408), then in step S409, the CPU 107 stores the state of a change in position in the DRAM 116. Next, the processing proceeds to step S406. After the above-described processing is executed, the CPU 107 ends detection of a change in position of an object. The position of the object is detected by the face detection module 112 when the object is a face. When the object is not a face, the position of the object can be detected from luminance difference information to be detected by the moving body detection unit 113 in an object area or the like.

Figure 5:
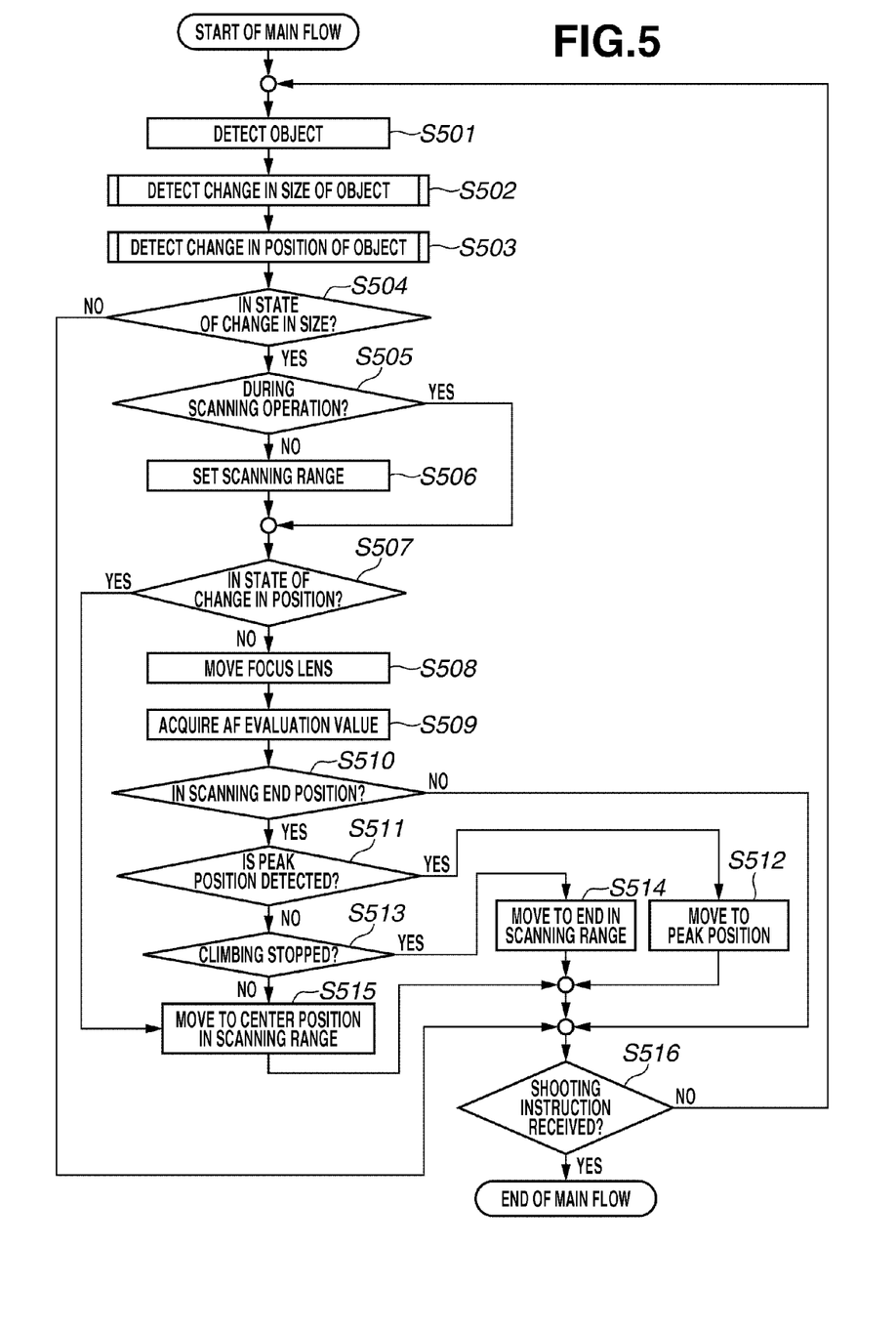
FIG. 5 is a flowchart illustrating a continuous scanning operation by the imaging apparatus.

Next, referring to a flowchart in FIG. 5, a continuous scanning operation when an object is detected by the imaging apparatus according to a second exemplary embodiment of the present invention will be described. In step S501, the CPU 107 executes detection of an object. Also in the present exemplary embodiment, the object is a face. The face is detected by the face detection module 112.

Next, in step S502, the CPU 107 detects a change in size of the object. The detail of processing to be executed in step S502 is as described above referring to FIG. 3. Next, in step S503, the CPU 107 detects a change in position of the object. The detail of processing to be executed in step S503 will be described below referring to FIG. 6.

Next, in step S504, the CPU 107 determines whether the size of the face detected in step S502 is in a state of a change. As the result of this determination, when it is determined that the size of the face is in a state of a change (YES in step S504), the processing proceeds to step S505. Further, if it is determined that the size of the face is not in a state of a change (NO in step S504), the processing proceeds to step S516. In step S516, the CPU 107 determines whether shooting is instructed. As the result of this determination, if shooting is instructed (YES in step S516), the continuous scanning operation in detecting the object ends. Further, if shooting is not instructed (NO in step S516), the processing returns to detection of an object in step S501.

In step S505, the CPU 107 determines whether the imaging apparatus is during a scanning operation. As the result of this determination, if the imaging apparatus is not during the scanning operation (NO in step S505), then in step S506, the CPU 107 executes a setting of a scanning range. Thereafter, the processing proceeds to step S507. Further, if the imaging apparatus is during the scanning operation (YES in step S505), the processing proceeds to step S507. In the setting of the scanning range to be executed in step S506, the CPU 107 sets an area five times as large as a focal depth which is a range to be considered that focus is adjusted on each of the near side and the far side about a current focus lens position. Furthermore, in the present exemplary embodiment, a scanning start position is the far end of the scanning range, and a scanning end position is the near end of the scanning range.

Next, in step S507, the CPU 107 determines whether the position of the face is in a state of a change. As the result of this determination, if it is determined that the position of the face is in a state of a change (YES in step S507), the processing proceeds to step S515, in which the CPU 107 moves the focus lens to the center position of the scanning range. Thereafter, the CPU 107 executes determination of whether shooting is instructed. On the other hand, as the result of determination in step S507, if it is determined that the position of the face is not in a state of a change (NO in step S507), then in step S508, the CPU 107 moves the focus lens. Next, in step S509, the CPU 107 acquires an AF evaluation value in the moved focus position.

Next, in step S510, the CPU 107 determines whether the focus lens 102 has been moved to the scanning end position. As the result of this determination, if the focus lens 102 is not moved to the scanning end position (NO in step S510), the processing proceeds to step S516. In step S516, the CPU 107 executes determination of whether shooting is instructed. Further, if the focus lens 102 is moved to the scanning end position (YES in step S510), then in step S511, the CPU 107 determines whether the peak position of the AF evaluation value is detected. As the result of this determination, when the peak position is detected (YES in step S511), then in step S512, the CPU 107 moves the focus lens position to the peak position. Thereafter, in step S516, the CPU 107 executes determination of whether shooting is instructed.

As the result of determination in step S511, when the peak position is not detected (NO in step S511), then in step S513, the CPU 107 determines whether the AF evaluation value is maximized in the scanning start position or the scanning end position, in which climbing stops. As the result of this determination, when climbing stops (YES in step S513), the processing proceeds to step S514. In step S504, the CPU 107 moves the focus lens position to the end where climbing stops. Thereafter, in step S516, the CPU 107 executes determination of whether shooting is instructed. Further, as the result of determination in step S513, when climbing does not stop (NO in step S513), the processing proceeds to step S515. In step S515, the CPU 107 moves the focus lens position to the center position of the scanning range. Thereafter, in step S516, the CPU 107 executes determination of whether shooting is instructed.

In the present exemplary embodiment, as described above, the scanning operation is continuously executed. Thus, focus can continuously be adjusted to an object having motion in a distance direction. Further, when it has been determined that the object is in a state of a change in position, the focus lens is not moved from the center position of the scanning range. Thus, when the distance of the object is not changed, scanning can be omitted, and the background-focused state can be prevented.

Figure 6:
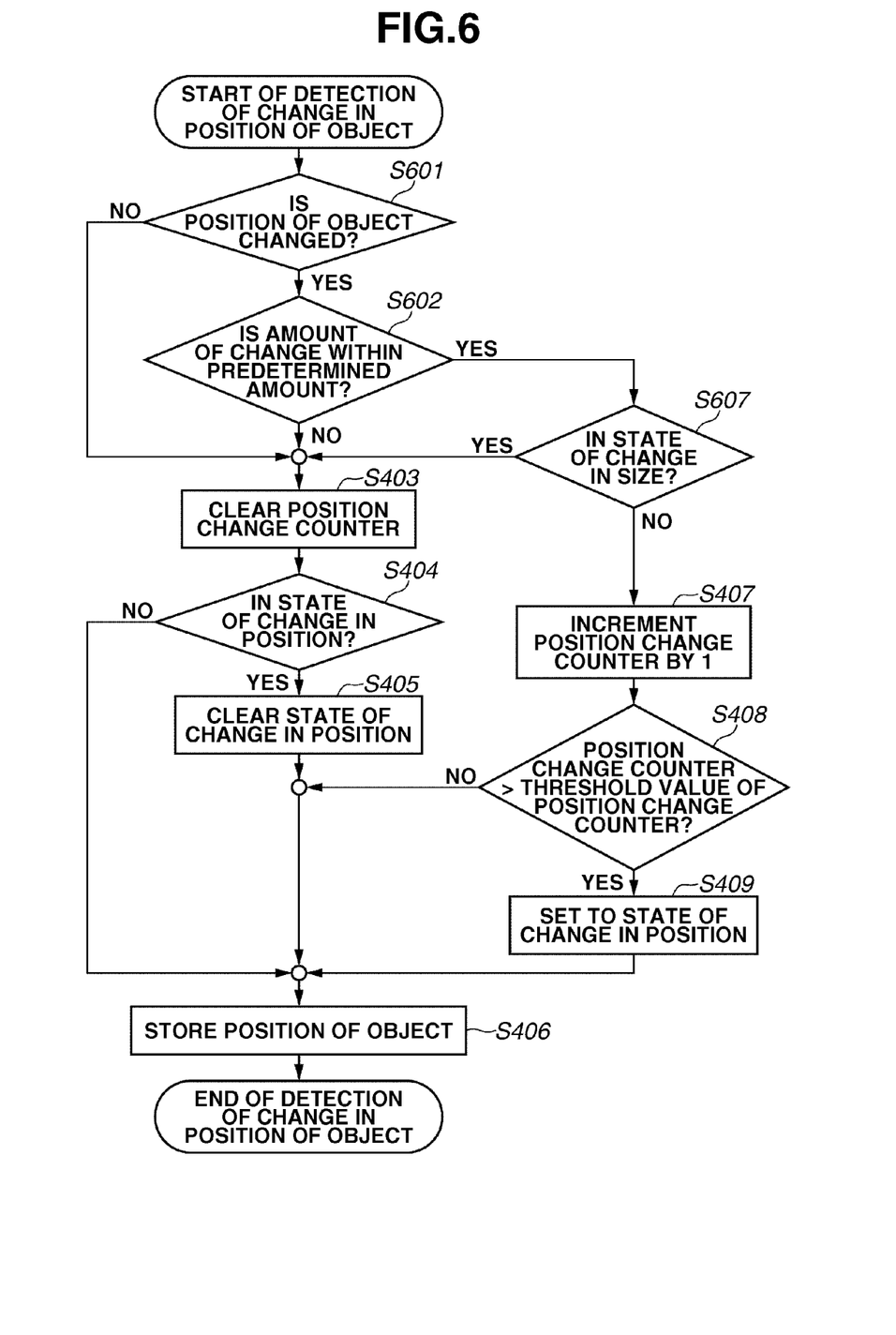
FIG. 6 is a flowchart illustrating a detection operation for a change in position of an object by the imaging apparatus.

Next, referring to a flowchart in FIG. 6, a detection operation of a change in position of an object by the imaging apparatus according to the present exemplary embodiment will be described. In step S601, the CPU 107 determines whether a position of the detected object has been changed. In determination of a change in position, the CPU 107 executes determination based on whether a difference is detected between the position of the object stored in the DRAM 116 in step S406 and the position of the object acquired this time.

As the result of determination in step S601, when it is determined that the position of the object is changed (YES in step S601), then in step S602, the CPU 107 determined whether the difference is within s predetermined amount. As the result of this determination, when the difference is equal to or larger than the predetermined amount (NO in step S602), it is considered that the object detected this time is different from the object previously detected.

As the result of determination in step S601, when it is determined that the position of the object is not changed (NO in step S601), the processing proceeds to step S403. Further, as the result of determination in step S602, if the amount of change in position of the object is not within the predetermined amount (NO in step S602), it is considered that the objects are different. Thus, the processing proceeds to step S403. Since processing executed in steps S403 to S406 is similar to the above-described processing executed in FIG. 4, the detail description thereof will not be repeated.

On the other hand, as the result of determination in step S602, if the amount of change in position of the object is within the predetermined amount (YES in step S602), the processing proceeds to step S607. Then, the CPU 107 determines whether the object is in a state of a change in size. This is determined by reading whether the state of a change in size is set in the DRAM 116. As the result of this determination, when the object is in the state of a change in size (YES in step S607), even if the position of the object is changed, the CPU 107 does not set the state of a change in position. Further, when the object is in the state of a change in position (YES in step S404), the CPU 107 cancels the state of a change in position. Thus, even if the scan is stopped according to the state of a change in position, when the size of the object is changed, the scan can be restarted.

As the result of determination in step S607, if it is determined that the object is in the state of a change in size (YES in step S607), the processing proceeds to step S403. Further, if it is determined that the object is not in the state of a change in size (NO in step S607), the processing proceeds to step S407. Since processing to be executed in steps S407 to S409 is similar to the above-described processing to be executed in FIG. 4, the detail description thereof will not be repeated.

Further, the present invention is realized by executing processing below. In the processing, software (computer program) that realizes a function in the above-described exemplary embodiment is supplied to a system or an apparatus via a network or various types of computer readable storage media. Then, a computer (or central processing unit (CPU), micro processing unit (MPU), etc.) in the system or the apparatus reads and executes a program.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-189154 filed Aug. 18, 2009, which is hereby incorporated by reference herein in its entirety.

What is claimed is:

1. An imaging apparatus comprising:
an imaging unit configured to photoelectrically convert an object image incident via a focus lens to acquire image data;
a detection unit configured to detect a size of an object and a position of an object based on the acquired image data;
an adjustment unit configured to execute focus adjustment by acquiring a focus signal indicating a focusing state of the focus lens based on the image data while moving the focus lens continuously, and moving the focus lens based on the focus signal; and
a control unit configured to execute the focus adjustment regardless of whether the detected position of the object has changed or the detected position of the object has not changed while the detected size of the object has changed, and not to execute the focus adjustment regardless of whether the detected position of the object has changed or the detected position of the object has not changed while the detected size of the object has not changed, wherein the control unit is configured to determine whether the detected position of the object is changed after determining whether the detected size of the object is changed, wherein the focus adjustment is controlled so that the center position of a scanning range of the focus lens moves following the change of the detected position of the object, and the scanning range of the focus lens is an area narrower than a moving range of the focus lens.

2. The imaging apparatus according to claim 1, wherein the control unit is controlled not to move the focus lens regardless of whether the detected position of the object has changed or the detected position of the object has not changed while the detected size of the object has not changed.

3. The imaging apparatus according to claim 1, wherein, in a case where a size of the detected object has changed and a position of the detected object has changed, the moving range of the focus lens when acquiring a focus signal while moving the focus lens is narrower than a case where a size of the detected object has changed and a position of the detected object has not changed.

* * * * *